US009465421B2

(12) United States Patent
Hayes (10) Patent No.: US 9,465,421 B2
(45) Date of Patent: Oct. 11, 2016

(54) PARTITIONED SWITCH MODE POWER SUPPLY (SMPS) INTERFACE

(71) Applicant: Broadcom Corporation, Irvine, CA (US)

(72) Inventor: Eric Martin Hayes, Fort Collins, CO (US)

(73) Assignee: Broadcom Corporation, Irvine, CA (US)

( * ) Notice: Subject to any disclaimer, the term of this patent is extended or adjusted under 35 U.S.C. 154(b) by 369 days.

(21) Appl. No.: 13/925,586

(22) Filed: Jun. 24, 2013

(65) Prior Publication Data

US 2014/0281593 A1 Sep. 18, 2014

Related U.S. Application Data

(60) Provisional application No. 61/799,558, filed on Mar. 15, 2013.

(51) Int. Cl.
*G06F 1/32* (2006.01)
*G06F 1/26* (2006.01)
*H02M 3/156* (2006.01)
*H02M 3/157* (2006.01)

(52) U.S. Cl.
CPC ............... *G06F 1/26* (2013.01); *H02M 3/156* (2013.01); *H02M 3/157* (2013.01)

(58) Field of Classification Search
CPC ........ G06F 1/26; H02M 3/156; H02M 3/157
See application file for complete search history.

(56) References Cited

U.S. PATENT DOCUMENTS

| | | | |
|---|---|---|---|
| 2007/0073449 A1* | 3/2007 | Kraemer et al. ................... 701/1 |
| 2008/0059816 A1* | 3/2008 | Paniagua ................... G06F 1/26 713/300 |
| 2009/0157928 A1* | 6/2009 | Riegebauer .................... 710/110 |
| 2009/0167092 A1* | 7/2009 | Ma ......................... G11C 5/147 307/75 |
| 2009/0243815 A1* | 10/2009 | Tolli .......................... 340/310.11 |
| 2012/0032657 A1* | 2/2012 | Dequina ................. H02M 1/38 323/271 |
| 2012/0100804 A1* | 4/2012 | Miles ........................... 455/41.1 |
| 2013/0235902 A1* | 9/2013 | Patel et al. .................... 374/152 |
| 2014/0036734 A1* | 2/2014 | Fong et al. .................... 370/276 |

* cited by examiner

*Primary Examiner* — Thomas Lee
*Assistant Examiner* — Chad Erdman
(74) *Attorney, Agent, or Firm* — Sterne, Kessler, Goldstein & Fox P.L.L.C.

(57) ABSTRACT

A single-wire interface of an application processor that communicates with another single-wire interface of a power management unit (PMU) via a control signal line. The control signal line can be a single signal path. Further, the single-wire interfaces can communicate with each other only via the control signal line. The single-wire interfaces can be utilized for the communication of pulse width modulation (PWM) control signals, current sensing, and Zero-I detection.

23 Claims, 3 Drawing Sheets

PARTITIONED SWITCH MODE POWER SUPPLY (SMPS) INTERFACE

CROSS REFERENCE TO RELATED APPLICATIONS

This patent application claims the benefit of U.S. Provisional Patent Application No. 61/799,558, filed Mar. 15, 2013, entitled "Partitioned Switch Mode Power Supply (SMPS) Interface," which is incorporated herein by reference in its entirety.

This patent application also relates to U.S. Provisional Patent Application No. 61/799,476, filed Mar. 15, 2013, entitled "Split-Switcher Voltage Regulator Architecture," and to U.S. patent application Ser. No. 13/925,567 filed on the same day as the present application, entitled "Split-Switcher Voltage Regulator Architecture," each of which is incorporated herein by reference in its entirety.

FIELD

This application relates generally to power management, and more particularly to voltage regulation utilizing a partitioned switch mode power supply (SMPS) interface.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

The embodiments of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

For purposes of this discussion, the term "module" shall be understood to include at least one of software, firmware, and hardware (such as one or more circuits, microchips, or devices, or any combination thereof), and any combination thereof. In addition, it will be understood that each module may include one or more components within an actual device, and each component that forms a part of the described module may function either cooperatively or independently of any other component forming a part of the module. Conversely, multiple modules described herein may represent a single component within an actual device. Further, components within a module may be in a single device or distributed among multiple devices in a wired and/or wireless manner.

In conventional power management systems, power management is performed utilizing a voltage regulator module that includes one or more voltage regulators that are configured to provide a regulated supply voltage to one or more components of the system (e.g., the microprocessor (CPU) within an applications processor), and a control circuit that is configured to monitor and adjust the supply voltage.

The power management system can utilize one or more well-known switching regulators to provide the regulated output voltage from a varying input voltage. For example, switching regulators can be implemented in battery powered electronic devices to regulate the battery output voltage which, when charged or discharged, can be greater than, less than, or substantially the same as the desired output voltage.

Conventional switching regulators generally have one or more power switches (e.g., field effect transistors (FET)) and an inductor-capacitor (LC) filter coupled between the unregulated input and the regulated output. In operation, the control circuit selects the switching regulator configuration (i.e., the operating mode) by controlling positions of the power switches and the duration of time during which switch positions remain unchanged.

Depending on the switch configurations, the switching regulator can operate as, for example, a buck converter, a boost converter, or a buck-boost converter. A buck converter down-converts an input voltage to a lower output voltage. The power switches operating in a buck converter configuration alternately connect the input voltage to and disconnect the input voltage from the input of the LC filter. A boost converter, on the other hand, up-converts an input voltage to a higher output voltage. In the boost converter configuration, the input voltage is continuously connected to the input of the LC filter, but the inductor of the LC filter is alternately connected to and disconnected from the load where the regulated output voltage is applied. A buck-boost converter switches between the buck-converter configuration and the boost converter configuration.

In an exemplary embodiment, a power management system includes a voltage regulator module (that receives the unregulated input voltage source) having one or more voltage regulators (e.g., power switches) and control circuitry located within a power management unit. In this configuration, the power management unit utilizes remote sensing devices that are configured to remotely sense the supplied voltage on one or more components within the system, including components within one or more application processors. For example, the remote sensing devices can be used to remotely sense the supplied voltage at one or more locations within a central processing unit (CPU) core of an application processor. The remotely-sensed voltage is then communicated to the power management unit via one or more communication lines. The sensed voltage is then communicated back to, and utilized by, the control circuit to regulate the supplied output voltage provided to, for example, the application processor.

In an alternative exemplary embodiment, the power management system includes a voltage regulator module having both voltage regulators (e.g., power switches) and control circuitry located within an applications processor (i.e., the voltage regulator and control circuitry being externally located with respect to the power management unit). In this configuration, the unregulated input voltage from the power management unit is supplied to the application processor. That is, the unregulated input voltage is supplied to one or more voltage regulators of the voltage regulator module within the application processor. Further, the control circuit of the voltage regulator module is configured to locally monitor and adjust the supplied output voltage within the application processor.

In an exemplary embodiment, the power management unit is formed utilizing a large feature process (e.g., a large manufacturing process technology) while the application processor is formed utilizing a small feature process (e.g., a small manufacturing process technology). As a result, the power management unit is formed on (or includes) a semiconductor substrate of a first type having a first feature size and the application processor is formed on (or includes) a semiconductor substrate of a second type having a second feature size, where the first feature size is larger than the second feature size. As known by those skilled in the art, the feature size defines the minimum feature size that can be formed using the respective process. In using a larger size manufacturing process technology, the power management unit can more easily be configured to utilize the higher voltage and/or current implementations typically used in power management units without damage to the transistors. Conversely, the smaller feature size manufacturing process technology of the application processor is configured to utilize more advanced lower voltage and/or current implementations that is capable of higher frequency operation than the larger feature size manufacturing process technology.

For example, the power management unit is formed utilizing a 0.18 micrometer (μm) manufacturing process technology. The application processor is formed utilizing, for example, a 28 nanometer (nm), 20 nm, or the like manufacturing process technology. The manufacturing process technologies utilized in the formation of the power management unit and the application processor are provided for example only and should not be limited to the above exemplary process sizes, and the process sizes can be any manufacturing process technology as will be apparent to those skilled in the relevant art(s).

Figure 1:
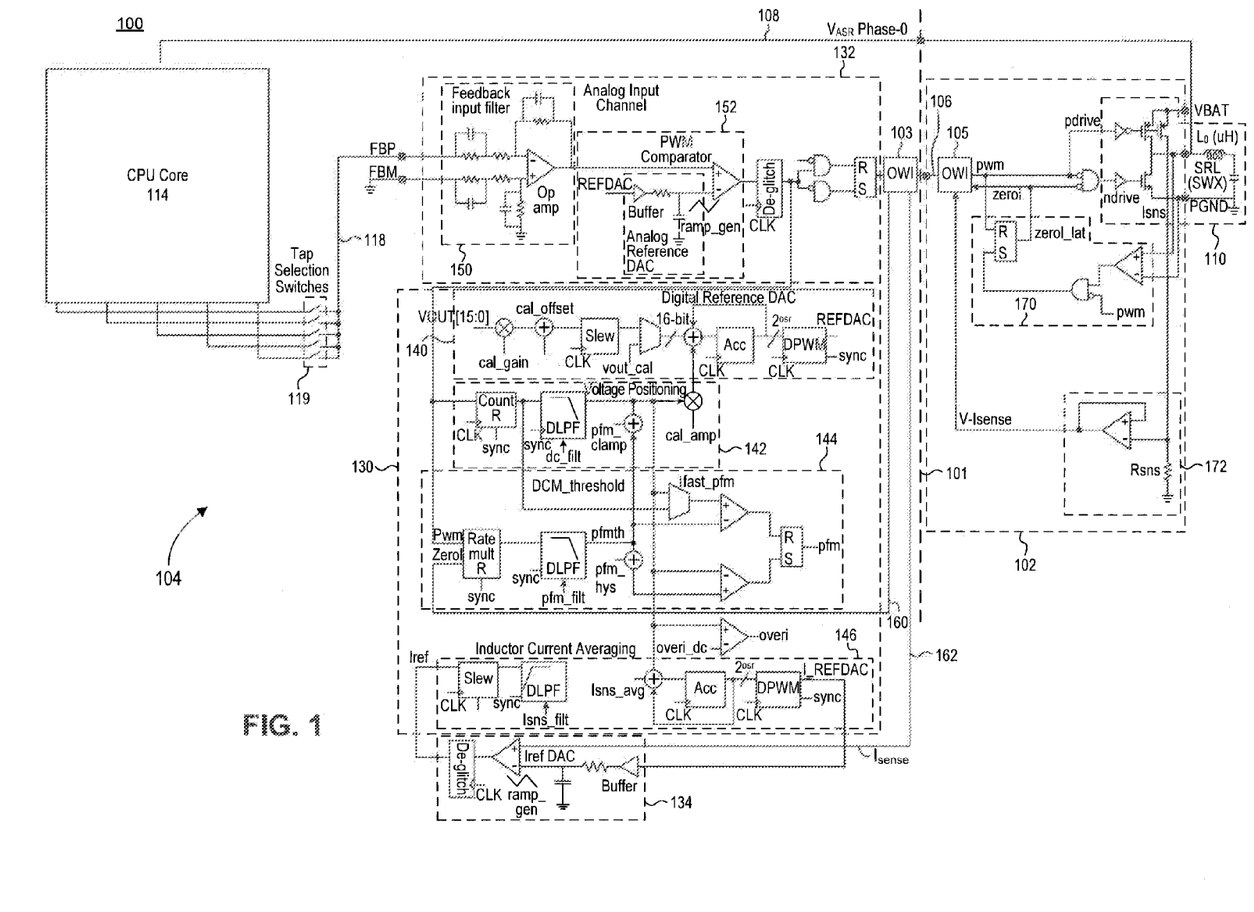
FIG. 1 illustrates a power management system in accordance with an exemplary embodiment of the present disclosure.

FIG. 1 illustrates a power management system 100 in accordance with an exemplary embodiment of the present disclosure. The system 100 includes a power management unit (PMU) 102 communicatively and electrically coupled to an application processor 104 via control signal line 106 and output voltage ($V_{out}$) supply line 108, respectively.

In an exemplary embodiment, the application processor 104 and the PMU 102 respectively include single-wire interface 103 and single-wire interface 105, which are each configured to communicate with the other via the control signal line 106. In particular, the single-wire interface 103 and single-wire interface 105 are connected via the control signal line 106, which, in an exemplary embodiment, is formed by a single wire. By utilizing a single-wire connection, the total number of signal lines that connect the PMU 102 and the application processor 104 remains low when the application processor 104 includes multiple CPU cores (i.e., multiple phases). As discussed in more detail below, the single-wire interface 103 is configured to provide the application processor 104 with ZeroI detection signals via ZeroI signal line 160, and/or current sense ($I_{sense}$) signals via current sense signal line 162 based on signals received from the PMU 102 via the control signal line 106. The single-wire interface 105 is configured to provide control signals received from the application processor 104 to the PMU 102, and to receive ZeroI detection signals and current sense ($I_{sense}$) signals that are then communicated to the application processor 104 via the control signal line 106. Herein, for the purposes of this discussion, ZeroI detection signals and current sense ($I_{sense}$) signals can be referred to as operation mode information as these signals are indicative of the operating mode of the power management system 100.

In an exemplary embodiment, the PMU 102 is formed utilizing a larger feature manufacturing process technology with respect to the manufacturing process technology implemented for the application processor 104. As a result, the PMU 102 is formed on (or includes) a semiconductor substrate of a first type having a first feature size and the application processor 104 is formed on (or includes) a semiconductor substrate of a second type having a second feature size, where the first feature size is larger than the second feature size. As known by those skilled in the art, the feature size defines the minimum feature size that can be formed using the respective process. For example, the PMU 102 is formed utilizing a 0.18 μm manufacturing process technology while the application processor 104 is formed utilizing, for example, a 28 nm, 20 nm, or the like manufacturing process technology. In this configuration, communication signal paths and electrical connections between the PMU 102 and the application processor 104 traverse a partition 101 defined by the different manufacturing process technologies.

The PMU 102 includes suitable logic, circuitry, and/or code that is configured to govern various power functions, including, for example, regulating an output voltage, measuring the voltage of one or more power sources (e.g., a battery, AC voltage source, etc.), and/or charging one or more battery power sources, for example $V_{BAT}$.

In an exemplary embodiment, the PMU 102 includes a power train module 110 that includes suitable logic, circuitry, and/or code that is configured to provide a regulated output voltage ($V_{out}$) from a varying input voltage. The input voltage can be provided from an AC voltage source and/or a DC voltage source (e.g., a battery). The power train module 110 includes one or more power switches (e.g., field effect transistors (FET), bipolar junction transistors (BJT), or the like) and an inductor-capacitor (LC) filter coupled between the unregulated input voltage source (e.g., $V_{BAT}$) and the regulated output ($V_{out}$).

In an exemplary embodiment, the PMU 102 also includes a ZeroI detection unit 170 and an inductor current sensing unit 172. The ZeroI detection unit 170 includes suitable logic, circuitry, and/or code that is configured to detect when a current through the inductor of the LC filter of the power train module 110 is zero or substantially zero (i.e., a high impedance state), and to generate a ZeroI detection signal based on the detected current. For the purpose of this discussion, and as discussed in more detail below, the power management system 100 operates in a discontinuous mode when the current though the LC filter is zero or substantially zero. The ZeroI detection unit 170 can include an operational amplifier whose inputs are connected between LC filter and ground (i.e., the non-inverted input connected to the LC filter and the inverted input connected to ground). The output of the operational amplifier is then connected to the single-wire interface 105 to provide the ZeroI detection signal to the single-wire interface 105. The ZeroI detection signal is then communicated to the single-wire interface 103 via the control signal line 106, which is then communicated to the application processor 104 to indicate the operational mode of the PMU 102 (e.g., that the PMU 102 is operating in the discontinuous mode).

The inductor current sensing module 172 includes suitable logic, circuitry, and/or code that is configured to detect the inductor current of the LC filter of the power train module 110 and provide the single-wire interface 105 with a current sense signal ($V\_I_{sense}$) that corresponds to the inductor current of the LC filter. The inductor current sensing unit 172 can include an operational amplifier configured as a unity buffer amplifier with the inverted input of the operational amplifier being connected to the input voltage source supplied to the power train module 110. The inverted input is also coupled to ground via a resistor $R_{SNS}$. The non-inverted input of the operational amplifier is connected to the output of the operational amplifier. The output of the operational amplifier is then connected to the single-wire interface 105 to provide the current sense signal ($V\_I_{sense}$) to the single-wire, interface 105. Here, the current sense signal ($V\_I_{sense}$) is a voltage corresponding to the inductor current of the LC filter through resistor having a known resistance value (in FIG. 2). In an exemplary embodiment, the inverted input is connected to a power switch located between the input voltage source and the regulated output source (e.g., to the drain of a FET, where the source of the FET is connected to the unregulated input voltage source of the power management system 100 and the gate receives the control signal from the single-wire interface 105).

In operation, the control of the power switches of the power train module 110 is based on control signals received by the power train module 110 from the application processor 104 via the single-wire interfaces 103, 105 and the control signal line 106.

In an exemplary embodiment, the power train module 110 is configured as a buck converter, a boost converter, or a buck-boost converter. As discussed in more detail below, the power train module 110 does not include control circuitry to control the regulation of voltage, nor is the control circuitry included in the PMU 102. Rather, the application processor 104 is configured to monitor and control the regulation of the output voltage ($V_{out}$) of the power train module 110 of the PMU 102 via the single-wire interfaces 103, 105 and the control signal line 106.

The application processor 104 includes suitable logic, circuitry, and/or code that is configured to carry out instructions to perform arithmetical, logical, and/or input/output (I/O) operations of one or more components of the power management system 100, and/or govern various power management functions of the power management system 100 by controlling the operations of the PMU 102 via the single-wire interfaces 103, 105 and the control signal line 106.

In an exemplary embodiment, the application processor 104 includes a central processing unit (CPU) core 114 configured to perform the one or more operations, a single-wire interfaces 103 that is configured to communicate with the single-wire interfaces 105 of the PMU 102 via the control signal line 106, an inductor current generation module 134, and a voltage comparison module 132 and reference voltage and current calculation module 130. The voltage comparison module 132, reference voltage and current calculation module 130, and inductor current generation module 134 are configured to cooperatively govern various power management functions of the power management system 100, including monitoring one or more points within the application processor 104, monitoring sensed inductor current communicated from the PMU 102 via the control signal line 106, and controlling the regulation of output voltage ($V_{out}$) of the PMU 102 (power train circuit 110) based on the results of such monitoring.

In controlling the regulation of the output voltage ($V_{out}$), application processor 104 is configured to provide a control signal to the power train module 110 via the single-wire interfaces 103, 105 and the control signal line 106. In an exemplary embodiment, the control signal is a pulse-width modulated (PWM) control signal, and the application processor 104 uses one or more PWM signals to control the operation of the PMU 102, including the operation of the power train module 110. The PWM control signals are communicated via the single-wire interfaces 103, 105 and the control signal line 106.

In operation, the application processor 104 is configured to monitor the sensed voltages at one or more points within the CPU core 114 via a voltage sensing signal line 118. Based on the monitoring of the sensed voltages, the application processor 104 adjusts, via one or more control signals transmitted to the PMU 102 via the control signal line 106, the regulation of the output voltage ($V_{out}$) provided by the PMU 102 via the output voltage supply line 108.

In an exemplary embodiment, and with continued reference to FIG. 1, the reference voltage calculation module 130 includes a low-frequency filter loop 140, a high-frequency filter loop 142, a discontinuous mode filter loop 144, and an inductor current filter loop 146, which collectively are referred to as filter loops 138.

The low-frequency filter loop 140, the high-frequency filter loop 142, the discontinuous mode filter loop 144, and inductor current filter loop 146 each include suitable logic, circuitry, and/or code that is configured to perform various signal processing functions, including, for example, filtering, digital-to-analog conversion (DAC), analog-to-digital conversion (ADC), slew rate calculation, pulse-width modulation (PWM), amplification, or the like, on feedback signals received from the voltage comparison module 132 (e.g., on signals corresponding to the control signals transmitted via control signal line 106 to the PMU 102) via feedback signal line 164, ZeroI detection signals received via ZeroI signal line 160, and/or current sense signals ($I_{sense}$) received via current sense signal line 162 from the single-wire interface 103. The various signal processing performed by the low-frequency filter loop 140, high-frequency filter loop 142, discontinuous mode filter loop 144, and inductor current filter loop 146 generates a digital reference voltage signal (REFDAC) that is used by the voltage comparison module 132 to generate the reference voltage ($V_{ref}$), and an inductor reference current signal (I_REFDAC) that is used by the inductor current generation module 134 to generate current sense reference signal ($I_{ref}$). The current sense reference signal ($I_{ref}$) is fed back to the low-frequency filter loop 140, the high-frequency filter loop 142, and the discontinuous mode filter loop 144 and utilized in the generation of the digital reference voltage signal (REFDAC).

The low-frequency filter loop 140 is configured to perform one or more of the various signal processing functions as discussed above on low-frequency signals feedback to the filter loops 138. For example, the low-frequency filter loop 140 performs signal processing on low-frequency signals (e.g., the low frequency control signals that output from the voltage comparison module 132) that are fed back from the voltage comparison module 132 to the reference voltage calculation module 130.

Similarly, the high-frequency filter loop 142 is configured to perform one or more of the various signal processing functions as discussed above on high-frequency signals supplied to the filter loops 138. For example, the high-frequency filter loop 142 performs signal processing on high-frequency signals (e.g., the high frequency control signals that output from the voltage comparison module 132) that are fed back from the voltage comparison module 132 to the reference voltage calculation module 130.

The discontinuous mode filter loop 144 is configured to perform one or more of the various signal processing functions as discussed above on signals supplied to the filter loops 138 when the PMU 102 is operating in a discontinuous mode. The discontinuous mode filter loop 144 is configured to receive control signals that are fed back from the voltage comparison module 132 to the reference voltage calculation module 130, and on ZeroI detection signals that are provided to the application processor 104 from the single-wire interface 103 via the ZeroI signal line 160.

The PMU 102 operates in a discontinuous mode when the current through an inductor of an LC filter of the power train module 110 is zero or substantially zero (i.e., a high impedance state). A ZeroI detection signals that indicates that the PMU 102 is operating in a discontinuous mode is provided to the application processor 104, and particularly to the discontinuous mode filter loop 144, from the single-wire interface 103 via the ZeroI signal line 160.

The inductor current filter loop 146 is configured to receive a current sense reference signal ($I_{ref}$) that is generated by the inductor current generation module 134, and to perform one or more of the various signal processing functions as discussed above to generate an inductor reference current signal (I_REFDAC) based on the current sense reference signal ($I_{ref}$). The inductor reference current signal (I_REFDAC) is fed back to inductor current generation module 134, which is used together with a current sense signal ($I_{sense}$) received via current sense signal line 162 from the single-wire interface 103, to generate the current sense reference signal ($I_{ref}$).

The inductor current filter loop 146 is also configured to feedback a processed current sense reference signal ($I_{ref}$) to the low-frequency filter loop 140, the high frequency filter loop 142, and the discontinuous mode filter loop 144, which is utilized in the generation of the digital reference voltage signal (REFDAC) by the low-frequency filter loop 140.

In an exemplary embodiment, the inductor current generation module 134 includes suitable logic, circuitry, and/or code that is configured to perform one or more of the various signal processing functions as discussed above on inductor reference current signals (I_REFDAC) feed back to the inductor current generation module 134 from the inductor current filter loop 146, and on current sense signals ($I_{sense}$) received via current sense signal line 162 from the single-wire interface 103.

In an exemplary embodiment, the inductor current generation module 134 includes an operational amplifier configured to generate a current sense reference signal ($I_{ref}$) based on a comparison between inductor reference current signals (I_REFDAC) fed back to the inductor current generation module 134 and current sense signals ($I_{sense}$) received via current sense signal line 162. In particular, the current sense signal line 162 is connected to the non-inverted input of the operational amplifier and the inductor reference current signals (I_REFDAC) is supplied to the inverted input. In an exemplary embodiment, the inductor current generation module 134 includes a resistor and capacitor connected at the inverted input of the operational amplifier. For example, the inverted input can be coupled to ground via the capacitor and the inverted input can be connected to the inductor current filter loop 146 via the resistor. That is, the resistor and capacitor can be connected so as to provide a low-pass filter at the inverted input, which filters the inductor reference current signals (I_REFDAC) feed back to the inductor current generation module 134 from the inductor current filter loop 146.

In an exemplary embodiment, the voltage comparison module 132 includes suitable logic, circuitry, and/or code that is configured to monitor voltages at one or more points within the application processor 104 (e.g., within the CPU core 114) via the voltage sensing signal line 118. Further, the voltage comparison module 132 is configured to control the regulation of the output voltage ($V_{out}$) from the PMU 102 based on the monitored voltages at the one or more points and the digital reference voltage signal (REFDAC) provided by the reference voltage and current calculation module 130. The voltage comparison module 132 controls the voltage regulation of the PMU 102 by providing one or more control signals to the PMU 102 via the single-wire interfaces 103, 105 and the control signal line 106.

The voltage comparison module 132 includes a feedback filter module 150 and a reference voltage ($V_{ref}$) generation module 152. The feedback filter module 150 includes suitable logic, circuitry, and/or code that is configured to perform various signal processing functions, including, for example, filtering and amplification. In an exemplary embodiment, the feedback filter module 150 is configured as an active filter that includes an operational amplifier having one or more capacitors and/or resistors connected to the inputs of the operational amplifier, and one or more capacitors and/or resistors connected between the output and the inverted input of the operational amplifier. Further, the inverted input of the operational amplifier is selectively connected to on or more points within the CPU core 114 via tap selection switches 119, while the non-inverted input is connected to ground. The output of the operational amplifier is connected to the reference voltage generation module 152 to supply a filtered signal (corresponding to the sensed voltages) to the reference voltage generation module 152.

The reference voltage ($V_{ref}$) generation module 152 includes suitable logic, circuitry, and/or code that can be configured to generate a control signal based on a comparison of the sensed voltages and a reference voltage ($V_{ref}$), where the reference voltage ($V_{ref}$) is generated using the digital reference voltage signal (REFDAC) provided by the reference voltage ($V_{ref}$) and current calculation module 130.

In an exemplary embodiment, the reference voltage ($V_{ref}$) generation module 152 includes an operational amplifier configured to compare a filtered signal (e.g., signal corresponding to the sensed voltages) from the feedback filter module 150 with the digital reference voltage signal (REFDAC) provided by the reference voltage and current calculation module 130. The reference voltage ($V_{ref}$) generation module 152 also includes a ramp generator circuit to generate a ramp voltage based on the digital reference voltage signal (REFDAC) provided by the reference voltage and current calculation module 130. The control signal provided to the PMU 102 by the reference voltage ($V_{ref}$) generation module 152 is used to adjust the regulation of the output voltage ($V_{out}$) provided by the PMU 102 via the output voltage supply line 108.

Figure 2:
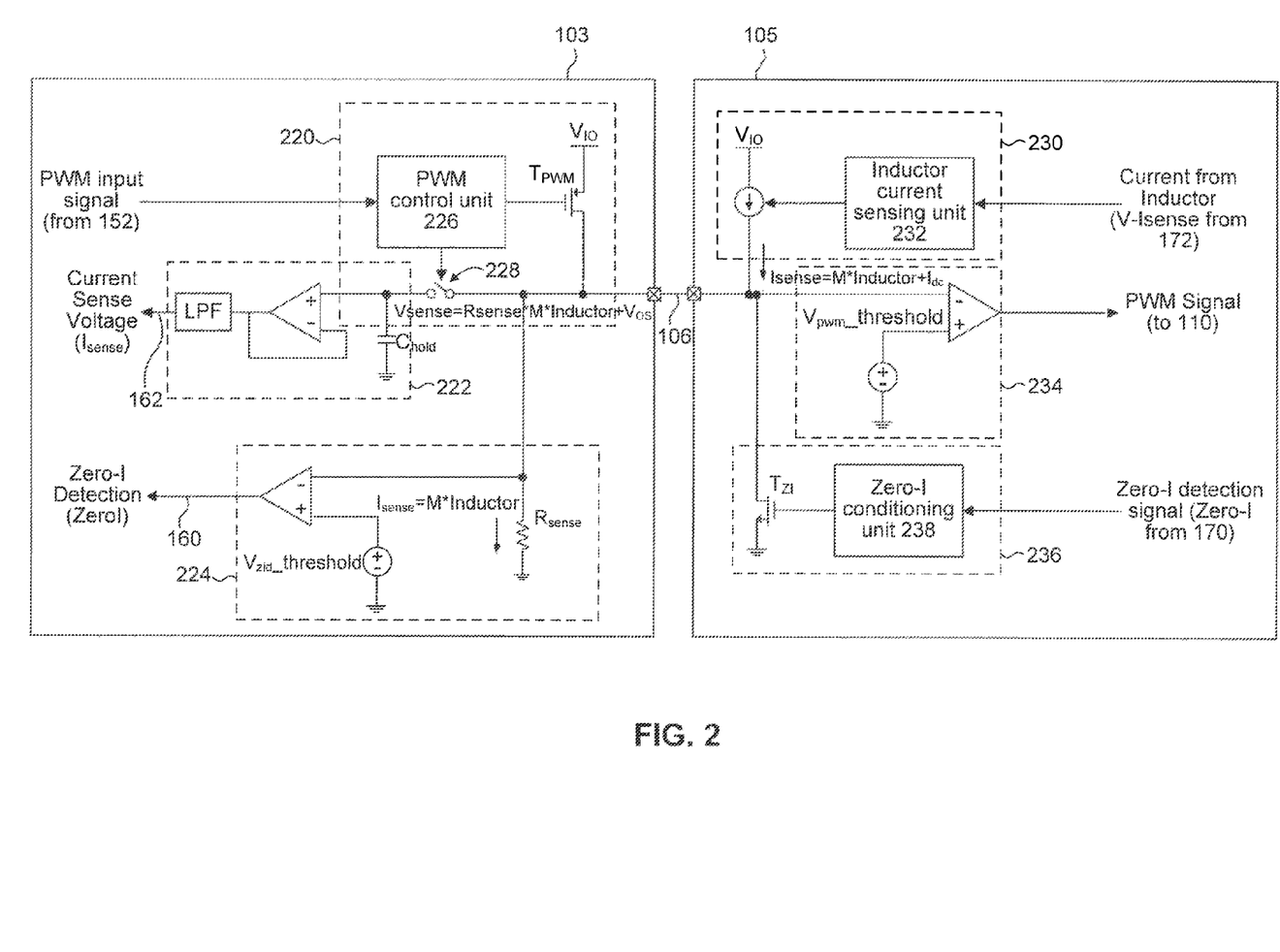
FIG. 2 illustrates single-wire interfaces in accordance with an exemplary embodiment of the present disclosure.
Figure 3:
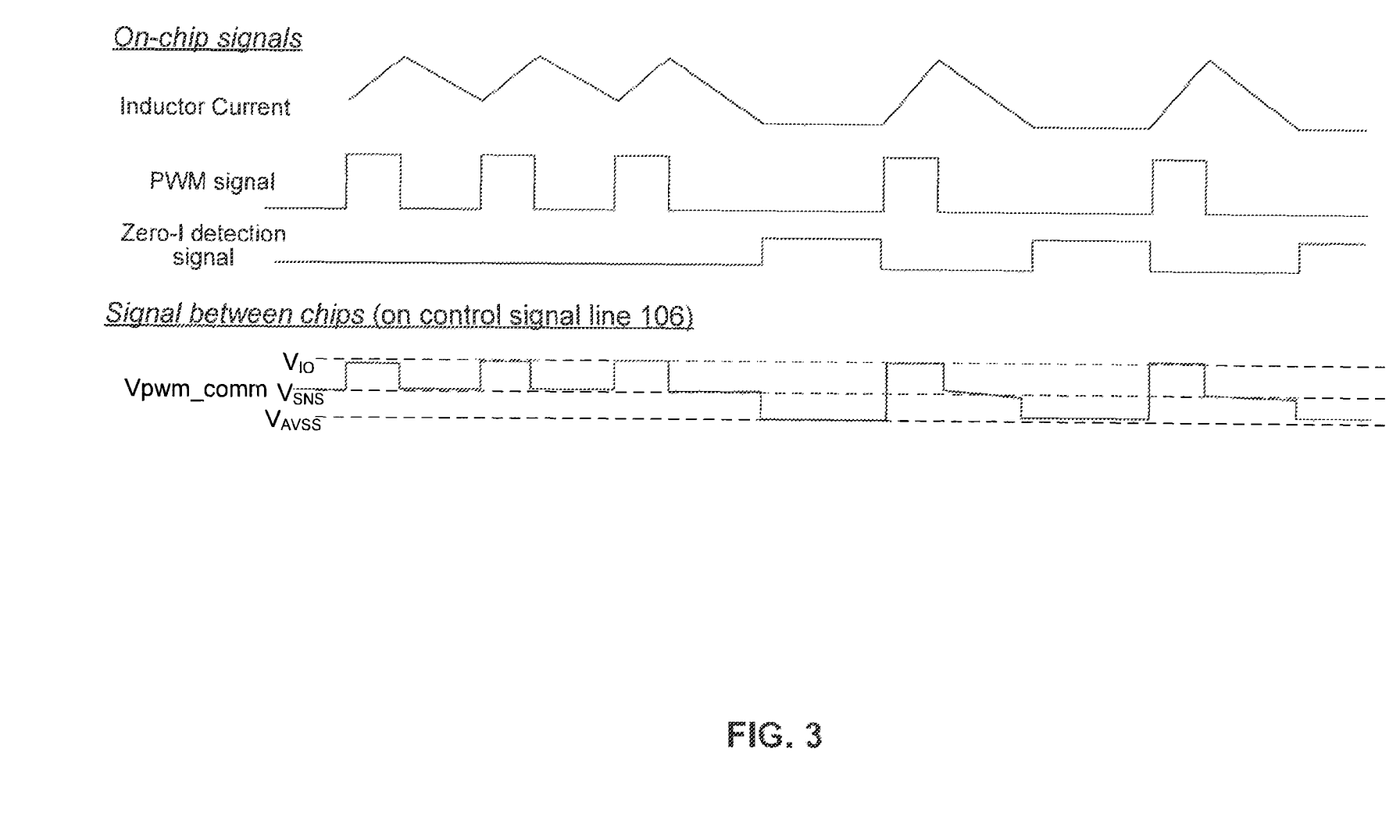
FIG. 3 illustrates example signal traces in accordance with an exemplary embodiment of the present disclosure.

FIG. 2 illustrates the single-wire interfaces 103, 105 in accordance with an exemplary embodiment of the present disclosure. Single-wire interfaces 103, 105 are communicatively coupled to each other via the control signal line 106. The discussion of the single-wire interfaces 103, 105 will be made with references to FIG. 2 and FIG. 3. FIG. 3 illustrates example internal signal traces (i.e., inductor current, PWM signal, and Zero-I detection signal) generated within the PMU 102 and application processor 104, and an example signal trace of a PWM control signal ($V_{pwm\_comm}$) that is communicated between the simile-wire interfaces 103 and 105 via the control signal line 106 in accordance with an exemplary embodiment of the present disclosure. As discussed in more detail below, the single control signal ($V_{pwm\_comm}$) represents the various internal control signals and operational modes of the power management system.

For the purpose of this discussion, the various voltages $V_{SNS}$, $V_{IO}$, and $V_{AVSS}$ of the PWM control signal ($V_{pwm\_comm}$) shown in FIG. 3 can be referred to as a default voltage, a high signal (pulled-up) voltage, and a low (pulled-down) voltage, respectively. Here, the high signal (pulled-up) voltage $V_{IO}$ is greater than the default voltage $V_{SNS}$ and the low (pulled-down) voltage $V_{AVSS}$ is less than the default voltage $V_{SNS}$. Further, the voltage detected by the current sensing module 222 (i.e., $V_{sense}$ in FIG. 2) is less than the high signal (pulled-up) voltage $V_{IO}$ and greater than the low (pulled-down voltage $V_{AVSS}$.

The single-wire interface 103 includes pulse-width modulation (PWM) control module 220, current sensing module 222, and ZeroI detection module 224. The single-wire interface 105 includes an inductor current sensing module 230, PWM sensing module 234, and ZeroI conditioning module 236.

The PWM control module 220 includes suitable logic, circuitry, and/or code that is configured to generate a control signal that is transmitted by the single-wire interface 103 to the single-wire interface 105 via the control signal line 106 to control the regulation of the output voltage ($V_{out}$) provided by the PMU 102 via the output voltage supply line 108. In an exemplary embodiment, the control signal is a PWM control signal. The PWM control module 220 can include a PWM control unit 226 that includes suitable logic, circuitry, and/or code that is configured to control the operation of switch 228 and power switch $T_{pwm}$, which is discussed in more detail below.

In an exemplary embodiment, and with reference to FIGS. 2 and 3, the PWM control module 220 generates the PWM control signal by pulling the default voltage ($V_{SNS}$) of the control signal line 106 up to a high signal voltage ($V_{IO}$) in operation, the high signal voltage ($V_{SNS}$) causes the PMU 102 to increase the output current through the inductor of the LC filter, while the default voltage ($V_{SNS}$) causes the PMU 102 to decrease the current to zero. In an exemplary embodiment, the PWM control unit 226 pulls the voltage of the control signal line 106 from the default voltage ($V_{SNS}$)) up to the high signal (pulled-up) voltage ($V_{IO}$) by activating a power switch $T_{pwm}$. Here, the high signal voltage ($V_{IO}$) is greater than the default voltage ($V_{SNS}$). As one of ordinary skill in the relevant art(s) will understand, the PWM control unit 226 can be alternatively configured to pull the voltage of the control signal line 106 from the default voltage ($V_{SNS}$)) down to low (pulled-down) voltage $V_{AVSS}$ instead of pulling the voltage up to the high signal voltage ($V_{IO}$) in this case, the ZeroI conditioning module 236 is configured to pull the voltage of the control signal line 106 up from a default voltage ($V_{SNS}$) to the high signal (pulled-up) voltage ($V_{IO}$) rather than down as discussed in the exemplary embodiment below. That is, in both cases, the PWM control unit 226 and the ZeroI conditioning module 236 are configured to pull the control signal line 106 in opposite directions with respect to each other. The power switch $T_{pwm}$ can be a field effect transistor (FET), a bipolar junction transistor (BJT), or the like. For the purpose of this discussion, the power switch $T_{pwm}$ is a field effect transistor (FET), and the gate of the power switch $T_{pwm}$ receives an activation signal from the PWM control unit 226, where the source is connected to the signal voltage ($V_{IO}$) source and the drain is connected to the control signal line 106. As discussed in more detail below, the change in voltage of the control signal line 106 is detected by the PWM sensing module 234 of the single-wire interface 105.

Further, the PWM control module 220 is configured to receive a PWM input signal generated by reference voltage ($V_{ref}$) generation module 152. That is, the control signal (i.e., PWM input signal in FIG. 2) generated by the reference voltage ($V_{ref}$) generation module 152 is received by the PWM control module 220 and passed to the PWM control unit 226. The received signal controls the PWM control module 220 to generate the PWM control signal by causing the PWM control unit 226 to activate/deactivate power switch $T_{pwm}$.

The PWM control unit 226 is also configured to control the operation of switch 228, which electrically connects the control signal line 106 to the current sensing unit 222. As discussed in more detail below with respect to the current sensing unit 222, the PWM control unit 226 and switch 228 are utilized to sample and hold voltages indicative of the inductor current of the PMU 102 generated by the inductor current sensing unit 232 of the single-wire interface 105.

The current sensing module 222 includes suitable logic, circuitry, and/or code that is configured to sense a voltage ($V_{sense}$) that corresponds to the inductor current of the PMU 102. The current sensing module 222 is also configured to sample and hold the sensed voltage ($V_{sense}$) and to perform filtering of the voltage ($V_{sense}$). As discussed above, the sensed voltage (i.e., $V_{sense}$) is less than the high signal (pulled-up) voltage $V_{IO}$ and greater than the low (pulled-down) voltage $V_{AVSS}$ shown in FIG. 3. In an exemplary embodiment, the current sensing module 222 includes a capacitor $C_{hold}$ having a first terminal connected between the switch 228 and non-inverted input of the operational amplifier, and a second terminal coupled to ground. Capacitor $C_{hold}$ holds the sensed voltage $V_{sense}$. Further, the current sensing module 222 includes a low-pass filter and an operational amplifier connected between the low-pass filter and the capacitor $C_{hold}$.

In an exemplary embodiment, the operational amplifier is configured as a unity buffer amplifier with the non-inverted input of the operational amplifier being connected to the capacitor $C_{hold}$ and control signal line 106 via the switch 228. The inverted input is connected to the output of the operational amplifier. The output of the low-pass filter is then connected to the inductor current generation module 134 via the current sense signal line 162. The filtered sensed voltage ($V_{sense}$) is communicated to the current generation module 134 as current sense signals ($I_{sense}$) shown in FIG. 1. In other words, the current sense signal ($I_{sense}$) represents the inductor current of the LC filter of the PMU 102.

The ZeroI detection module 224 includes suitable logic, circuitry, and/or code that is configured to detect the voltage of the control signal line 106, and to compare the detected voltage with a threshold voltage to determine whether the PMU 102 is operating in a discontinuous mode (e.g., when the current through the inductor of an LC filter of the power train module 110 is zero or substantially zero).

The ZeroI detection module 224 includes a resistor $R_{sense}$ having first terminal connected to the control signal line 106 and a second terminal connected to ground, and an operational amplifier whose inverted input is connected to the control signal line 106 and the first terminal of resistor $R_{sense}$ non-inverted input that is connected to a ZeroI threshold voltage ($V_{zid\_threshold}$) source, and output that is connected to the discontinuous mode filter loop 144 via the ZeroI signal line 160.

The operational amplifier is configured to compare the ZeroI threshold voltage ($V_{zid\_threshold}$) to the voltage of the control signal line 106 (i.e., the voltage corresponding to $I_{sense}$ generated by inductor current sensing module 230 through resistor $R_{sense}$ having a known resistance value, where $I_{sense}$ is indicative of the current through the inductor of the LC filter loop), and to generate ZeroI detection signals (ZeroI signals in FIG. 1) based on the comparison. For example, when the voltage of the control signal line 106 is less than the ZeroI threshold voltage ($V_{zid\_threshold}$), the ZeroI detection module 224 provides the discontinuous mode filter loop 144 with ZeroI detection signals (ZeroI signals in FIG. 1) to indicate that the PMU 102 is operating in a discontinuous mode.

As discussed above, FIG. 3 illustrates example internal signal traces (i.e., inductor current, PWM signal, and Zero-I detection signal) generated within the PMU 102 and application processor 104, and an example signal trace of a PWM control signal ($V_{pwm\_comm}$) that is communicated between the single-wire interfaces 103 and 105 via the control signal line 106. The single control signal ($V_{pwm\_comm}$) represents the various internal control signals and operational modes of the power management system. In operation, to indicate that the PMU 102 is operating in the discontinuous mode (e.g., zero or substantially zero current through the inductor of the LC filter loop), the voltage of the control signal line 106 ($V_{pwm\_comm}$) is pulled down from a default voltage ($V_{SNS}$) to a low voltage ($V_{AVSS}$) by the ZeroI conditioning module 236 based on the Zero-I detection signal generated by the ZeroI. Detection unit 170. As discussed above, one of ordinary skill in the relevant art(s) will understand. That the ZeroI conditioning module 236 can be alternatively configured to pull the voltage of the control signal line 106 from the default voltage ($V_{SNS}$) up to the high signal (pulled-up) voltage ($V_{IO}$) instead of pulling the voltage down to the low voltage ($V_{AVSS}$). In this case, the PWM control unit 226 is configured to pull the voltage of the control signal line 106 down from a default voltage ($V_{SNS}$) to the low signal voltage ($V_{AVSS}$) rather than up to the high signal voltage ($V_{IO}$). That is, in both cases, the PWM control unit 226 and the ZeroI conditioning module 236 are configured to pull the control signal line 106 in opposite directions with respect to each other. The operational amplifier of the ZeroI detection module 224 compares the voltage of the control signal line 106 (i.e., the voltage of the control signal $V_{pwm\_comm}$) to ZeroI threshold voltage ($V_{zid\_threshold}$), and then generates ZeroI detection signals (ZeroI signals in FIG. 1) based on the comparison. For example, when the voltage of the control signal line 106 (i.e., the voltage of the control signal $V_{pwm\_comm}$) is, for example, less than the ZeroI threshold voltage ($V_{zid\_threshold}$) (i.e., the voltage of the control signal line 106 is $V_{AVSS}$), the ZeroI detection module 224 generates ZeroI detection signal. As discussed in more detail below, the voltage of the communication signal line 106 is pulled to ground (e.g., $V_{AVSS}$) by the ZeroI conditioning module 236 to indicate that the PMU 102 is operating in a discontinuous mode.

With continued reference to FIGS. 2 and 3, the inductor current sensing module 230 of the single-wire interface 105 includes suitable logic, circuitry, and/or code that is configured to generate a current corresponding to the inductor current of the PMU 102. For the purposes of this discussion, the current generated by the inductor current sensing module 230 can be referred to as operation, mode information as the generated current corresponds to the inductor current, and the amount of inductor current is indicative of the operating mode of the PMU 102. In an exemplary embodiment, the inductor current sensing module 230 includes an inductor current sensing unit 232 having suitable logic, circuitry, and/or code that is configured to control a current source connected between the control signal line 106 and the signal voltage ($V_{IO}$) source to generate the current $I_{sense}$ (in FIG. 2) based on current sense signal ($V\_I_{sense}$) provided by the inductor current sensing module 172 of FIG. 1. The current $I_{sense}$ (in FIG. 2) is detected by the current sensing module 222 of the single-wire interface 103 based on the voltage ($V_{sense}$) across resistor $R_{sense}$, where $V_{sense} = R_{sense} \times I_{sense}$.

The PWM sensing module 234 includes suitable logic, circuitry, and/or code that is configured to sense a voltage on the control signal line 106 (i.e., the voltage of the control signal $V_{pwm\_comm}$ in FIG. 3), to compare the sensed voltage to a PWM threshold voltage ($V_{pwm\_threshold}$), and to generate and provide a PWM control signal to the power train unit 110 of the PMU 102 based on the comparison. For the purpose of this discussion, the PWM threshold voltage ($V_{pwm\_threshold}$) is, for example, greater than the default voltage ($V_{SNS}$) but less than the high signal voltage ($V_{IO}$).

The PWM sensing module 234 includes an operational amplifier whose inverted input is connected to the control signal line 106 and non-inverted input that is connected to a PWM threshold voltage ($V_{pwm\_threshold}$) source that generates the PWM threshold voltage ($V_{pwm\_threshold}$). The output of the operational amplifier is connected to the power train unit 110 of the PMU 102, and provides the PWM control signals to the power switches of the power train unit 110 to adjust the voltage regulation of the PMU 102. That is, the PWM sensing module 234 compares the PWM threshold voltage ($V_{pwm\_threshold}$) to the voltage of the PWM control $V_{pwm\_comm}$ (FIG. 3) on the control signal line 106, and based on this comparison, generates a control signal that controls the operation of the power train module 110. In operation, when the default voltage ($V_{SNS}$) of the control signal line 106 has been pulled up to high signal voltage ($V_{IO}$) by the PWM control module 220, and thereby exceeding the PWM threshold voltage ($V_{pwm\_threshold}$), the PWM sensing module 234 can output a control signal causing the PMU 102 to increase the output current through the inductor of the LC filter. Similarly, when the control signal line 106 has returned to the default voltage ($V_{SNS}$), thereby falling below the PWM threshold voltage ($V_{pwm\_threshold}$), the PWM sensing module 234 can cause the PMU 102 to decrease the output current.

The ZeroI conditioning module 236 includes suitable logic, circuitry, and/or code that is configured to adjust the voltage of the control signal line 106 to indicate an operation mode of PMU 102. In particular, the ZeroI conditioning module 236 is configured to pull the voltage of the control signal line 106 to ground to indicate that the PMU 102 is operating in the discontinuous mode (e.g., zero or substantially zero current through the inductor of the LC filter). The ZeroI condition module 236 includes a ZeroI conditioning unit 238 that includes suitable logic, circuitry, and/or code that is configured to generate a control signal to activate/deactivate a power switch to connect/disconnect the control signal line 106 to/front ground. For the purposes of this discussion, the adjusted voltage of the control signal line 106 can also be referred to as operation mode information as the adjusted voltage corresponds to the presence of zero (or substantially zero) inductor current, and the amount of inductor current is indicative of the operating mode (e.g., a discontinuous mode) of the PMU 102.

In operation, the ZeroI conditioning unit 238 generates the control signals to activate/deactivate, power switch $T_{ZI}$ to connect/disconnect the control signal line 106 to/from ground (e.g., voltage $V_{AVSS}$ in FIG. 3). As discussed above, the presence of the voltage $V_{AVSS}$ on the control signal line 106 is detected by the ZeroI detection module 224, which provides the application processor 104 with the indication that the PMU 102 is operating in a discontinuous mode. For example, the voltage of the control signal $V_{pwm\_comm}$ (FIG. 3) on the control signal line 106 is pulled from a default voltage (e.g., $V_{SNS}$ in FIG. 3) to ground (e.g., voltage $V_{AVSS}$ in FIG. 3), where the default voltage ($V_{SNS}$) is greater than the pulled-down voltage ($V_{AVSS}$). In an exemplary embodiment, the voltage $V_{AVSS}$ (e.g., ground) is less than the default voltage $V_{SNS}$ and the pulled-up voltage $V_{IO}$ (discussed above with respect to the (PWM) control module 220) is greater than the default voltage $V_{SNS}$.

In an exemplary embodiment, the power switch $T_{ZI}$ can be a field effect transistor (FET), a bipolar junction transistor (BJT), or the like. For the purpose of this discussion, the power switch $T_{ZI}$ is a field effect transistor (FET), and the gate of the $T_{ZI}$ receives an activation signal from the ZeroI conditioning unit 238, where the source is connected to ground and the drain is connected to the control signal line 106. The change in voltage of the control signal line 106 is detected by the ZeroI detection module 224, which then generates and transmits the ZeroI detection signal (ZeroI in FIG. 1) to the application processor 104 (e.g., discontinuous mode filter loop 144) via the ZeroI signal line 160.

Further, the ZeroI conditioning unit 238 is configured to receive a ZeroI detection signal (zeroI in FIG. 1) generated by the ZeroI detection unit 170. Based on the received ZeroI detection signal (zeroI in FIG. 1), the ZeroI conditioning unit 238 controls the power switch $T_{ZI}$ to pull the voltage of the control signal line 160 to ground, thereby indicating that the PMU 102 is operating in a discontinuous mode. With reference to FIG. 3, as discussed above, the voltage of the control signal ($V_{pwm\_comm}$) on the control signal line 106 is pulled down to a voltage (e.g., $V_{AVSS}$ in FIG. 3) when the PMU 102 is operating in a discontinuous mode. The ZeroI detection module 224 of the single-wire interface 103 detects the pulled down voltage ($V_{AVSS}$), and then indicates to the application processor 102 that the PMU 102 is operating in a discontinuous mode based on this detection.

CONCLUSION

The aforementioned description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments within the spirit and scope of the disclosure. Therefore, the specification is not meant to limit the invention. Rather, the scope of the invention is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventors, and thus, are not intended to limit the present invention and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries may be defined so long as the specified functions and relationships thereof are appropriately performed.

What is claimed is:

1. A power management system including an application processor and a power management unit (PMU), the power management system comprising:
   a first single-wire interface of the application processor, the application processor being configured to generate one or more control signals;
   a second single-wire interface of the PMU, the PMU being configured to generate an output voltage based on the one or more control signals; and
   a control signal line that connects the first and second single-wire interfaces, wherein the first single-wire interface transmits the one or more control signals to the second single-wire interface via the control signal line, and the second single-wire interface transmits one or more operating modes of the PMU to the first single-wire interface via the control signal line, wherein the one or more operating modes are used by the first single-wire interface to monitor the output voltage generated by the PMU, and wherein the one or more control signals are adjusted based on the one more operating modes to regulate the output voltage generated by the PMU.

2. The power management system according to claim 1, wherein the first and second single-wire interfaces communicate with each other utilizing only the control signal line.

3. The power management system according to claim 1, wherein the one or more control signals are pulse-width modulated (PWM) control signals.

4. The power management system according to claim 1, wherein the control signal line is a single communication path that connects the first and second single-wire interfaces.

5. The power management system according to claim 3, wherein the first and second single-wire interfaces communicate with each other utilizing only the control signal line.

6. The power management system according to claim 1, wherein the first single-wire interface includes:
a control unit configured to adjust a first voltage on the control signal line to a second voltage;
a current sensing unit configured to sense a third voltage on the control signal line, the third voltage being generated by the second single-wire interface; and
a zero current detection unit configured to sense a fourth voltage on the control signal line, the fourth voltage being indicative of an operating mode of the one or more operating modes of the PMU.

7. The power management system according to claim 6, wherein the second voltage is greater than the first voltage, and the fourth voltage is less than the first voltage.

8. The power management system according to claim 1, wherein the second single-wire interface includes:
a current sensing unit configured to adjust a current on the control signal line based on an inductor current of the PMU;
a zero current conditioning unit configured to adjust a first voltage on the control signal line to a second voltage, the second voltage being indicative of an operating mode of the one or more operating modes of the PMU; and
a control signal sensing unit configured to indicate the presence of the one or more control signals on the control signal line based on a comparison of a third voltage on the control signal line with a reference voltage, the third voltage being generated by the first single-wire interface.

9. The power management system according to claim 8, wherein the second voltage is less than the first voltage, and the third voltage is greater than the first voltage.

10. A first single-wire interface communicatively coupled to a second single-wire interface via a control signal line, the first single-wire interface comprising:
a control unit configured to adjust a first voltage on the control signal line to a second voltage based on one or more signals from an application processor;
a current sensing unit configured to sense a third voltage on the control signal line, the third voltage being generated by the second single-wire interface; and
a zero current detection unit configured to sense a fourth voltage on the control signal line, the fourth voltage being indicative of an operating mode of a power management unit (PMU), wherein the fourth voltage is used by the first single-wire interface to monitor an output voltage generated by the PMU, and wherein the first voltage is adjusted based on the fourth voltage to regulate the output voltage generated by the PMU.

11. The first single-wire interface according to claim 10, wherein the second voltage is greater than the first voltage, and the fourth voltage is less than the first voltage.

12. The first single-wire interface according to claim 10, wherein the current sensing unit is configured to:
generate a current sense signal based on the sensed third voltage, the current sense signal corresponding to an inductor current of the PMU.

13. The first single-wire interface according to claim 10, wherein the zero current detection unit is configured to:
compare the fourth voltage with a reference voltage;
generate a zero current signal based on the comparison; and
output the zero current signal to the application processor.

14. The first single-wire interface according to claim 10, wherein the adjustment to the second voltage by the control unit instructs the PMU to adjust a regulated output voltage of the PMU.

15. The first single-wire interface according to claim 10, wherein the first single-wire interface is connected to the second single-wire interface only via the control signal line.

16. A second single-wire interface communicatively coupled to a first single-wire interface via a control signal line, the second single-wire interface comprising:
a current sensing unit configured to adjust a current on the control signal line based on an inductor current of a power management unit (PMU);
a zero current conditioning unit configured to adjust a first voltage on the control signal line to a second voltage, the second voltage being indicative of an operating mode of the PMU; and
a control signal sensing unit configured to sense a third voltage on the control signal line, the third voltage being generated by the first single-wire interface, wherein the second voltage is used by the first single-wire interface to monitor an output voltage generated by the PMU, and wherein the third voltage is adjusted based on the second voltage to regulate the output voltage generated by the PMU.

17. The second single-wire interface according to claim 16, wherein the control signal sensing unit is configured to:
compare the third voltage with a reference voltage;
generate a control signal based on the comparison; and
output the control signal to the PMU.

18. The second single-wire interface according to claim 16, wherein the zero current conditioning unit adjusts the first voltage on the control signal line to the second voltage to indicate the PMU is operating in a discontinuous mode operation.

19. The second single-wire interface according to claim 16, wherein the second voltage is less than the first voltage, and the third voltage is greater than the first voltage.

20. The second single-wire interface according to claim 16, wherein the second single-wire interface is connected to the first single-wire interface only via the control signal line.

21. The power management system according to claim 1, wherein the second single-wire interface of the PMU is configured to determine whether the PMU is operating in a discontinuous mode and the one or more operating modes indicate a result of the determination of whether the PMU is operating in the discontinuous mode.

22. The first single-wire interface according to claim 10, wherein the operating mode of the PMU indicates whether the PMU is operating in a discontinuous mode.

23. A power management system including an application processor and a power management unit (PMU), the power management system comprising:
- a first single-wire interface of the application processor, the application processor being configured to generate one or more control signals;
- a second single-wire interface of the PMU configured to determine whether the PMU is operating in a discontinuous mode, the PMU being configured to generate an output voltage based on the one or more control signals; and
- a control signal line that connects the first and second single-wire interfaces,
- wherein the first single-wire interface transmits the one or more control signals to the second single-wire interface via the control signal line, and the second single-wire interface transmits one or more operating modes of the PMU to the first single-wire interface via the control signal line, the one or more operating modes indicating a result of the determination of whether the PMU is operating in the discontinuous mode.

* * * * *